US008744824B2

(12) United States Patent
Duan et al.

(10) Patent No.: US 8,744,824 B2
(45) Date of Patent: Jun. 3, 2014

(54) OPTIMIZATION DESIGN METHOD FOR THE CHASSIS STRUCTURE OF AN ELECTRONIC DEVICE BASED ON MECHANICAL, ELECTRICAL AND THERMAL THREE-FIELD COUPLING

(75) Inventors: Baoyan Duan, Shaanxi (CN); Hui Qiao, Shaanxi (CN); Peng Li, Shaanxi (CN); Shibo Jiang, Shaanxi (CN); Boyuan Ma, Shaanxi (CN); Ning Han, Shaanxi (CN); Lizhi Zeng, Shaanxi (CN); Yu He, Shaanxi (CN)

(73) Assignee: Xidian University (CN)

( * ) Notice: Subject to any disclaimer, the term of this patent is extended or adjusted under 35 U.S.C. 154(b) by 314 days.

(21) Appl. No.: 13/259,262

(22) PCT Filed: Sep. 24, 2009

(86) PCT No.: PCT/CN2009/074186
§ 371 (c)(1),
(2), (4) Date: Sep. 23, 2011

(87) PCT Pub. No.: WO2010/105471
PCT Pub. Date: Sep. 23, 2010

(65) Prior Publication Data
US 2012/0016639 A1 Jan. 19, 2012

(30) Foreign Application Priority Data
Mar. 20, 2009 (CN) .......................... 2009 1 0021618

(51) Int. Cl.
G06F 17/50 (2006.01)

(52) U.S. Cl.
USPC ........................... 703/7; 703/1; 703/2; 703/6

(58) Field of Classification Search
CPC ............ G06F 17/5009; G06F 17/5018; G06F 17/5086; G06F 2217/06; G06F 2217/08; G06F 2217/80; G06F 2217/82; G06F 2217/16; G06T 17/20; G06T 17/205
See application file for complete search history.

(56) References Cited

U.S. PATENT DOCUMENTS

2003/0154451 A1* 8/2003 Rassaian ........................ 716/4
2004/0102938 A1  5/2004 Nakashima
2008/0104553 A1* 5/2008 Rassaian et al. ................ 716/4

FOREIGN PATENT DOCUMENTS

CN 101281552 A 10/2008
CN 101344564 A 1/2009
CN 101510229 A 8/2009

OTHER PUBLICATIONS

McKnight et al., Coupled Structural/Thermal/Electromagnetic Analysis/Tailoring of Graded Composite Structures: Second Annual Status Report, Apr. 1992.* Zheng et al., Simulation of Chassis Electromagnetic Shielding Characteristics Based on ANSYS, Proc. 2008 IEEE International Conference on Mechatronics and Automation.* PCT/CN2009/074186 Written Opinion of the International Searching Authority, Dec. 17, 2009.
* cited by examiner

*Primary Examiner* — Kamini S Shah
*Assistant Examiner* — Michael P Healey
(74) *Attorney, Agent, or Firm* — Workman Nydegger (57) ABSTRACT

An optimizing design method for a chassis structure of electronic equipment is disclosed, including: investigating from the point of view of mechanical, electric and thermal three-field coupling, determining the preliminary design size of the chassis, performing a mechanical analysis by using a mechanical analysis software such as ANSYS; converting the mesh model among the three-fields, obtaining the mesh model used for the electromagnetic and thermal analyses; setting the thermal analysis parameters, performing the thermal analysis by using an electromagnetic analysis software such as ICEPAK; determining a resonance frequency of the chassis and an electric parameter of the absorbing material, performing an electromagnetic analysis by using a thermal analysis software such as FEKO; correcting the analysis result by sample testing; determining whether the chassis satisfies the design requirement, if it satisfies the requirement, the optimizing design will be finished, otherwise, modifying the preliminary computer assisted design model, the electromagnetic analysis parameter and the thermal analysis parameter, repeating the above processes until the requirement is satisfied.

6 Claims, 6 Drawing Sheets

OPTIMIZATION DESIGN METHOD FOR THE CHASSIS STRUCTURE OF AN ELECTRONIC DEVICE BASED ON MECHANICAL, ELECTRICAL AND THERMAL THREE-FIELD COUPLING

BACKGROUND OF THE INVENTION

1. Field of the Invention

The invention relates to the structure design field of an electronic device, in particular to an optimization design method for a structure, which can be used to guide the optimization design for the chassis structure of an electronic device and the analysis of thermal and electromagnetic compatibility property.

2. Background and Relevant Art

With the rapid development of the electronic industry, the range of application of an electronic device becomes increasingly widely, and an electronic device is present everywhere, not only in a daily life but also in a military field.

An electronic device will be inevitably affected by various external loads such as a vibration, an impact, a centrifugal force and a friction generated from a movement, during the course of transport, storage and use, wherein the vibration and the impact are most harmful. According to statistics, of the environmental factors causing a failure of an airborne electronic device, the vibration factor accounts for 27%, and in the electronic devices used in a modern war, 50%-60% of the failures are due to a mechanical vibration and a explosion impact. The destructive effect is mainly manifested in two aspects: a mechanical damage caused by a vibration impact and the degradation and failure of an electrical performance of a device, which will result in a fatigue failure of an electronic device, a drift of an electrical parameter, a break of a component lead or the peeling off of a solder joint and the loosing of a fastener, etc. It was experimentally found that the vibration causes more damages than the impact does. As the main load-bearing parts, the design of the chassis structure of an electronic device is very important.

There are still problems of electromagnetic compatibility in an electronic device, the electromagnetic compatibility is the ability to work properly in a common electromagnetic environment without being affected by an interference. In practice, the examples of problems resulting from bad electromagnetic compatibility are without number, for example, the civil aviation prohibits passengers from using some specific electronic devices, such as cell phones and the like, in flight. Therefore, an electronic product must get through a certification of electromagnetic compatibility. Electromagnetic compatibility problems exist not only between devices, but also between components, between members, and between systems, or even exist inside an integrated circuit. The main solution is to perform an electromagnetic shielding. For an electrical device, with the chassis as a main shielding structure, openings and apertures on a chassis body and the layout of an internal structure will affect the electromagnetic shielding effectiveness of an electronic device.

Meanwhile, there are many electronic components inside an electronic device, with the increase of integration of electronic components, the heat generation also increases, in order to ensure the proper work of the components, the temperature inside the chassis of the electronic device must be controlled, and a heat dissipation treatment is required. Because the reliability of electronic components is extremely sensitive to the temperature, the reliability will be decreased by 5% with the device temperature increasing every one degree Celsius at 70-80 degrees Celsius. A volume of the electronic device needs to be controlled, which is especially a fact for a military electronic device, which results in a great difficulty for the heat dissipation. Thus a thermal design of the chassis of the electronic device is also very critical.

The chassis of an electronic device is to combine a variety of electronic components or mechanical parts inside the electronic device as a whole, and to avoid or decrease the effects on electrical performance due to an adverse factor such as a high or low temperature, a vibration impact, an electromagnetic interference. An electronic device structure is designed to provide the internal electronic components and assemblies with a good micro-environment able to resist harsh conditions outside, an anti-vibration buffer design, a thermal control design and an electromagnetic compatibility design is one of key technologies thereof. Multi-field coupling of an electronic device thus becomes the focus of a research and design.

For the structure design of the chassis of this type of electronic device, in the present, usually the structure design is made first, and then a thermal analysis and an electromagnetic compatibility analysis, the structure design is reasonable if meeting the relevant requirements; otherwise the structure design is modified, the thermal analysis and the electromagnetic compatibility analysis are performed again. During this design flow, the three separate disciplines are clearly independent each other, resulting in a long design cycle, difficulties for an product meeting the requirements of the three aspects of mechanical, electrical and thermal aspects simultaneously. A lot of researches have been done by foreign and domestic scholars with respect to the multi-field coupling problem, but mostly are restricted to a particular engineering field, do not have a broad applicability, and the research of the multi-field coupling problem with respect to the chassis structure and the like of electronic devices is still very rare.

BRIEF SUMMARY OF THE INVENTION

The object of the present invention is to solve the problem that the mechanical field, electrical field and thermal field are separated in the design of the current chassis structure of an electronic device, which results in a long design cycle and difficulties in meeting various requirements. An optimization design method for the chassis structure of an electronic device based on mechanical, electrical and thermal three-field coupling model is proposed to achieve an efficient design of the chassis of the electronic device.

To achieve the above object, the technical solution of the present invention comprises: proposing a mathematic model of three-field coupling based on the full study of the interaction principle of the three fields of the mechanical filed, the electrical field and the thermal field of the chassis; performing an analysis of three-field coupling on the chassis of the electronic device including a structural mechanics analysis, a temperature field thermal analysis and an electromagnetic field analysis, wherein an analysis software can be used such as a mechanical analysis software used in a structural analysis, an electromagnetic analysis software used in an electromagnetic analysis and a thermal analysis software used in a thermal analysis; and then introducing a multi-discipline optimization method to optimize the design of the chassis structure, and the specific steps are as follows:

(1) determining a preliminary design size of the chassis structure according to a work environment of the electronic device and a specific requirement so as to establish a preliminary Computer Assisted Design ("CAD") model of the chassis structure for a mechanical finite element analysis;

(2) with respect to the established preliminary CAD model, performing a structure mechanics analysis with a finite element method, establishing a finite element model first, setting a constraint and a load, and performing a related mechanical analysis based on a requirement, i.e. using a commercial mechanical analysis software such as ANSYS11.0 to obtain various structure mechanics parameters and a chassis body deformation, which are compiled into data files for mechanical analysis;

(3) extracting a mesh model information with the chassis being deformed from the data file for mechanical analysis, and performing a transform of a mesh model among three fields and obtaining a mesh model for electromagnetic and thermal analysis;

(4) based on the established chassis CAD model in step (1), setting a specific heat and a thermal conductivity of a material of a heat dissipation component, and preliminary thermal analysis parameters like the power flow of a fan and an ambient temperature;

(5) according the extracted mesh model for the thermal analysis in step (3) and the set thermal analysis parameters in step (4), performing a temperature field thermal analysis, i.e. setting thermal analysis parameters first, setting boundary conditions, dividing a mesh of limit volume, performing a related thermal analysis according to the requirement, i.e. obtaining a temperature field distribution of the chassis using a commercial thermal analysis software such as ICE-PAK4.4.8 and compile it into a heat analysis data file;

(6) based on the established chassis CAD model in step (1), determining preliminary electromagnetic analysis parameters like a resonant frequency of the chassis and an electrical parameter of the absorbent material;

(7) performing a electromagnetic analysis on the extracted electromagnetic analysis mesh in step (3), an excitation load being applied first, dividing an electromagnetic analysis mesh, setting the object and region to be solved, performing an electromagnetic analysis according to the requirement, i.e. an electromagnetic field distribution inside and outside the chassis may be obtained using a commercial electromagnetic analysis software such as FEKO5.3 and compile it into an electromagnetic analysis data file;

(8) with respect to the data files of the three analysises of the mechanical analysis, the electromagnetic analysis and the thermal analysis, designing a sample and performing a simulation analysis on it based on a actual engineering condition, then obtaining a simulation error by testing the result of the simulation analysis with an experiment, and correcting the analysis result of the chassis CAD model based on the simulation error; and (9) based on the corrected analysis result, determining whether the design of the chassis meets the requirement or not, if yes, the optimization design is finished and the structure parameters of the chassis are output, if no, the preliminary CAD model, the electromagnetic analysis parameter and the thermal analysis parameter are modified and steps (1) to (9) are repeated until the requirement is met.

Of course, in addition to using a commercial mechanical analysis software such as ANSYS in the structure analysis, using a commercial electromagnetic analysis software such as FEKO in the electromagnetic analysis, using a commercial thermal analysis software such as ICEPAK in the thermal analysis, etc. as stated above, the model can also be calculated with programs written by the designer or with other professional softwares.

The optimization design method for the chassis structure of the electronic device as stated above, wherein the transform of a mesh model among three fields in step (3) including the following steps:

(3.1) combining the meshes with an overlap in a mesh model with the chassis being deformed;

(3.2) transforming a middle node present in the mesh model with the chassis being deformed into a mesh node;

(3.3) extracting a node of a board shell element mesh from the mesh model with the chassis being deformed;

(3.4) extracting a node of an entity element surface mesh from the mesh model with the chassis being deformed;

(3.5) recombining the extracted mesh nodes into a new mesh element;

(3.6) subdividing newly combined mesh element based on the electromagnetic and thermal analysis accuracy requirements.

The optimization design method for the chassis structure of the electronic device as stated above, wherein determining the resonant frequency of the chassis and the electrical parameters of the absorbent material according to step (6) including the following steps:

(6.1) calculating a theoretical resonant frequency with a theoretical formula based on the size of the chassis structure, the theoretical resonant frequency calculation formula is as follows:

$$f_{10p} = \frac{c}{2\pi\sqrt{\mu_r \varepsilon_r}} \sqrt{\left(\frac{\pi}{a}\right)^2 + \left(\frac{p\pi}{l}\right)^2}$$

Where a and l is the width and the length of the chassis, $\varepsilon$ is the dielectric constant, $\mu$ is the magnetic permeability, c is the speed of light, and P is the mode.

(6.2) using a electromagnetic analysis software to find the resonance frequency with the strongest field strength, by sweeping near the theoretical resonant frequency, as an actual resonant frequency of the chassis;

(6.3) determining the electric conductivity, the magnetic permeability, the electric loss tangent and the magnetic loss tangent of the absorbent materials based on related property parameters provided by the manufacturer of the absorbent materials, or by means of set values in published documents, or by assuming a value in advance.

The optimization design method for the chassis structure of the electronic device as stated above, wherein correcting the analysis result based on a sample experiment according to step (8) including the following steps:

(8.1) a practicality sample of the chassis is manufactured according to the preliminary CAD model;

(8.2) an electric field distribution value inside and outside the chassis is measured for the sample;

(8.3) a temperature distribution value inside the chassis is measured for the sample;

(8.4) the result of the sample simulation is written as $C_{simulation}$, the result of the sample measurement is written as $C_{test}$, if the error $\alpha$ is within a specified value, the simulation model is considered in line with the actual sample, otherwise, the simulation model is modified until the error $\alpha$ meets the requirement of being within the specified value, wherein $\alpha = [(C_{test} - C_{simulation})/C_{test}] \times 100\%$;

(8.5) the actual chassis model is simulated in the optimization design and the simulation result is written as $E_{simulation}$, and then, using the error $\alpha$, the simulation result is corrected as $$E_{test} = \frac{E_{simulation}}{1-\alpha}.$$

Compared with prior arts, the present invention has the following advantages:

1. In the optimization design of a chassis structure, due to the use of the parameters of the thermal field and the electromagnetic field as optimization targets or constraints, it is an optimization design method based on a multi-field coupling, which solves the problem of the traditional separation of multidisciplinary; while fully taking into account the design requirements of different disciplines, greatly reducing the design cycle of the chassis;

2. In the optimization design, not only making full use of existing commercial software for computer-aided design, but also testing the results of a computer simulation through the design of an actual sample, an actual test, and making a correction based on the test, making the product designed finally meet the practice better.

DETAILED DESCRIPTION OF THE PREFERRED EMBODIMENTS

Figure 1:
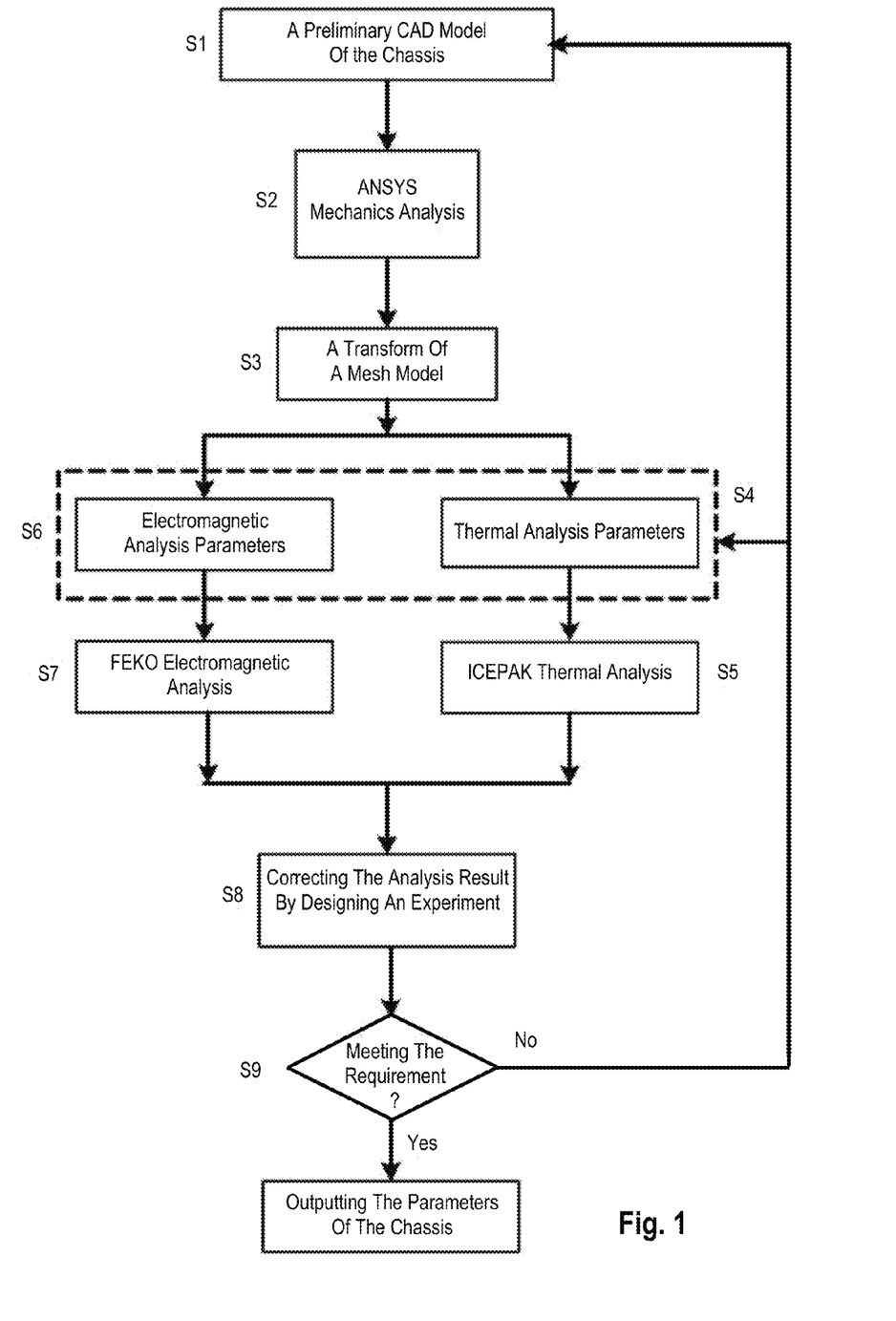
FIG. 1 is a flow chart of an optimization design of the chassis structure of an electronic device according to the present invention.

The present invention is further described in detail with reference to the figures. Refer to FIG. 1, the specific steps of the present invention are as follows:

Step S1: the preliminary design size of the chassis structure is determined and the preliminary CAD model of the chassis is established.

According to a work environment of the electronic device and specific requirements, the preliminary design size of the chassis structure is determined, mainly including a material of the chassis, outline sizes such as width a, length l, and height b, a heat dissipation aperture, the number and the position of a fan(s), the size and the position of an internal absorbent material, the position of various major components inside the chassis, a distribution of the internal support structures, and the like, thereby to establish the preliminary CAD model of the chassis for a finite element analysis in mechanics. The determination of the preliminary design size can be based on the experience of the designer and the existing chassis products of electronic devices in large to reduce a design effort.

Step S2: mechanical analysis of the chassis.

A structural mechanics finite element analysis is performed on the preliminary CAD model of the chassis, wherein a mechanical analysis software can be used, i.e. the commercial mechanical analysis software such as ANSYS11.0. According to use requirements, a variety of external loads is added, mainly vibration and impact loads. China has a detailed vibration test specifications and standards, for example, the standard GB/T2423.11 gives a general requirement of a harsh level of a broadband random vibration, the standards GJB150.16-86 and GJB150.18-86 "environmental test methods of a military device" provide an experimental method for a vibration and an impact in detail, and the products are detailedly classified according to the vibration environments in transport and use. Based on these standards, a variety of loads are added to the electronic device to simulate the corresponding vibration environments, the required structural mechanics parameters and chassis structural deformation are obtained through software analysis, and the results are compiled into the data files of mechanical analysis.

Of course, the structural analysis here can also be performed for the model by calculating with programs written by the designer or by analyzing with other professional softwares having functions similar to those of a commercial mechanical analysis software such as ANSYS.

Step S3: the transform of mesh model among three fields.

The transmission of information between the various models is needed in the three-field coupling analysis, and the key is that the preliminary CAD model can be imported into different analysis softwares, so the mesh model after the structural analysis (analysis completed with a commercial mechanical analysis software such as ANSYS) needs to be transformed. According to different analysis softwares used, the transform methods are slightly different too, here the structural analysis uses a commercial mechanical analysis software such as ANSYS, the electromagnetic analysis uses a commercial electromagnetic analysis software such as FEKO, and the thermal analysis uses a commercial thermal analysis software such as ICEPAK as a reference.

Figure 2:
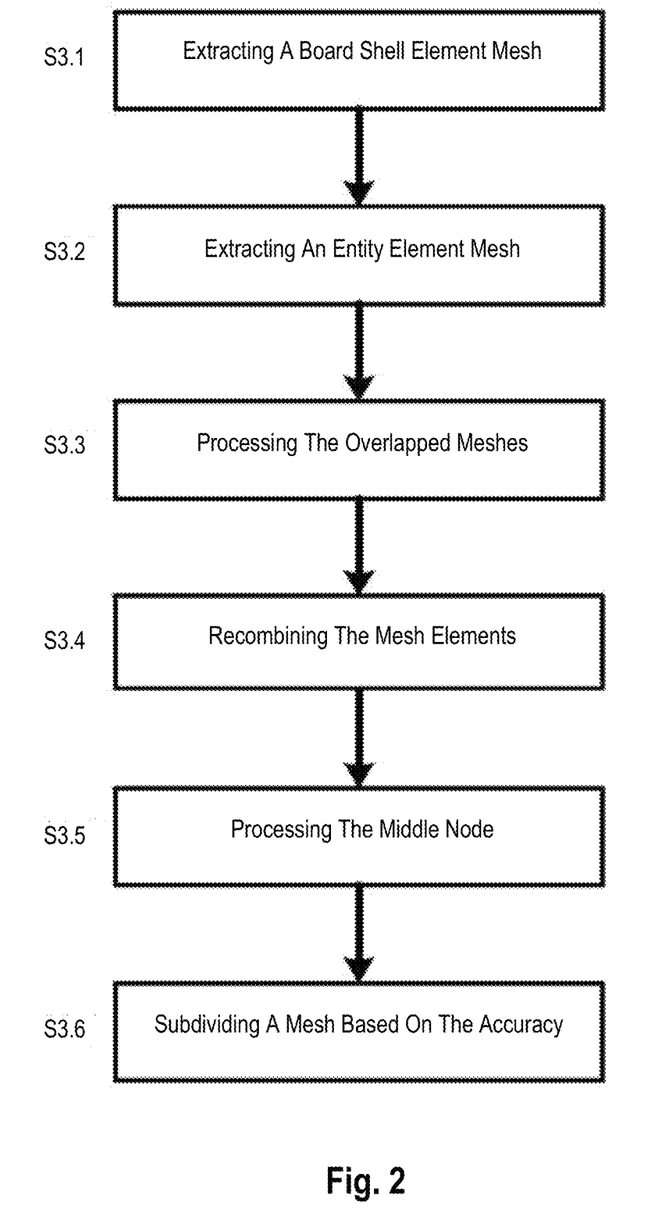
FIG. 2 is a flow chart of the transforming of a mesh model among the three fields according to the present application.

Refer to FIG. 2, the steps of transforming the mesh model are as follows:

Step S3.1: The extraction of an element mesh of the house.

All of the structural analysis software, the electromagnetic analysis software and the thermal analysis software used in the present invention can handle triangle meshes. Compared to the electromagnetic and thermal analysis, one of the significant features of the structural analysis is that its element types are more than those of the electromagnetic and thermal analysis. For a triangular element mesh of the house, it is extracted directly according to an element number; for a quadrilateral element mesh of the house, each quadrangle is divided into two triangles, and then is extracted according to the way of a triangular element.

Step S3.2: The extraction of surface entity element mesh.

Figure 4:
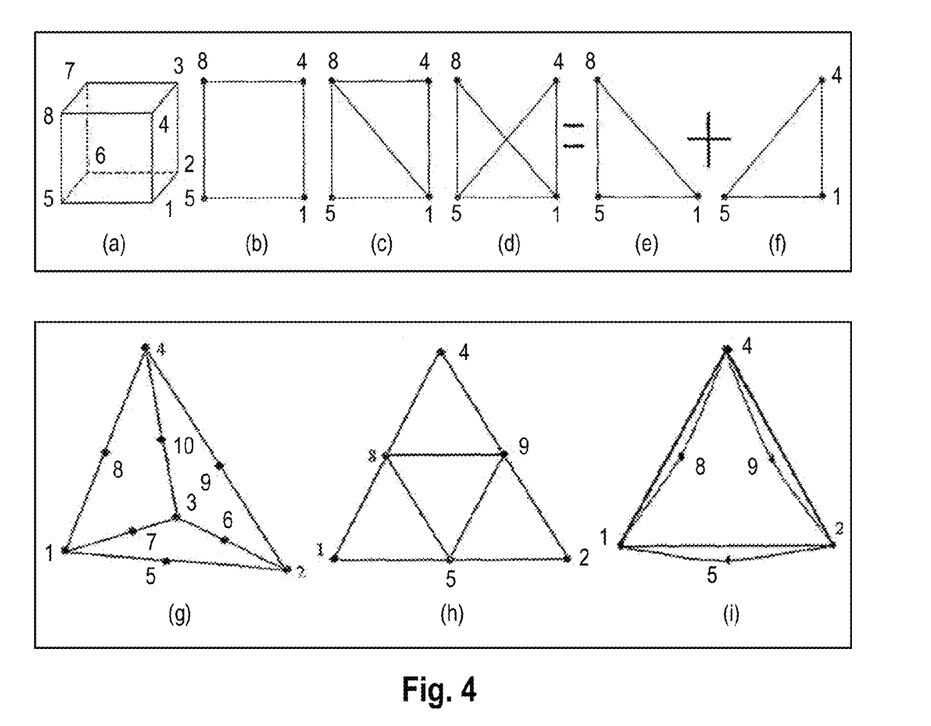
FIG. 4 is a diagram of a surface mesh recombination and a middle nodes mesh process.

For an entity element, such as a cube, as shown in FIG. 4 (*a*), the key is to extract each quadrangle of the outer surface of the entity element. The extraction consists of two aspects: one is to extract the nodes of outer surface; the second is to extract the relationship between the surface nodes. First of all, all the surfaces of the entity is extracted, and then all the nodes on the entity surfaces are found, the connection relationship between the nodes are determined according to the affiliations between these nodes and the surfaces. If the node connection way is a triangle, it can be used directly, and if a quadrangle, then it needs to be re-divided into two triangles.

Step S3.3: The handling of overlapped meshes.

Figure 3:
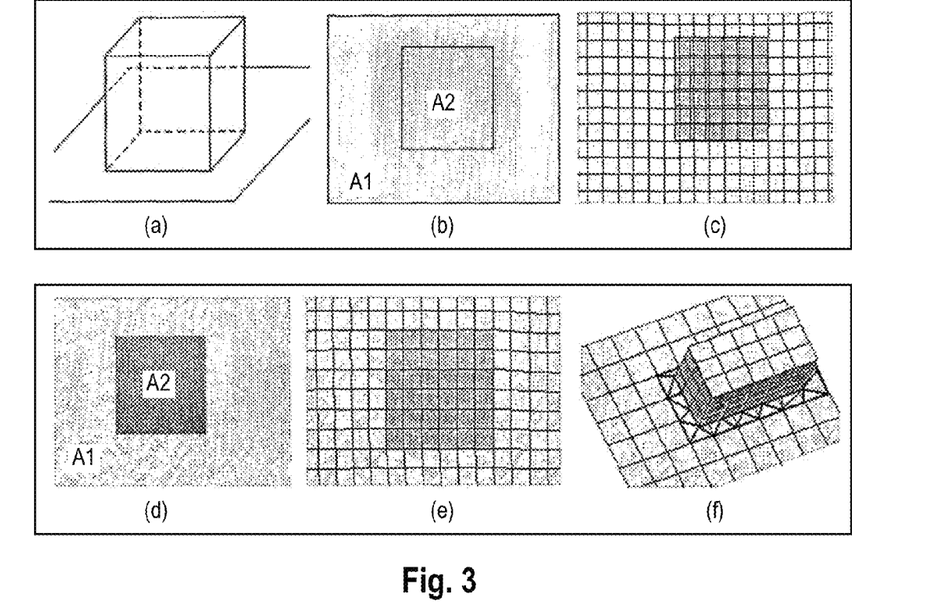
FIG. 3 is a diagram of a process of overlapped meshes.

As the analysis of commercial software does not allow overlapped meshes, so it needs to process the preliminary CAD model mesh in order to exclude the case of overlapped meshes. The phenomenon of overlapped meshes is as shown in FIG. 3, FIG. 3 (a) is the combination of a block and a board structure, a entity block is placed on the board, as shown in FIG. 3 (b), a bottom surface of the block and a surface of the board are coplanar in the geometry model, and the overlap situation of FIG. 3(c) will appear after a mesh division. The process of mesh overlap is divided into two steps of the process of model and the process of mesh.

The combining of overlapped meshes is performed according to the following steps:

3.3.1 Processing of the Overlapped Meshes in a Model Level.

For an intersected and superposed face of two entities, the sum operation of Boolean operation is used to combine the overlapped meshes to ensure a continuous mesh division. For the face that superposes with a body, as shown in FIG. 3(a), the board can be divided with the four sides of the bottom face of the entity block, removing the overlapped meshes on the face, as the two sections of A1 and A2 shown in FIG. 3(d), wherein A1 does not include a part of A2 area, after re-division of the meshes, it is as shown in FIG. 3(e). Figure (f) is a more complicate situation. The solution is to retain the integrity of the surface of the entity element, remove the board elements pressed under the entity block, and then re-connect the nodes around board vacancies and the nodes around an entity bottom edge, shown as the solid line in figure (f). The key of the process of model is to retain the continuity of the divided meshes between different structures, which is achieved mainly through the use of Boolean operation between models.

3.3.2 Processing of the Overlapped Meshes in the Mesh Level.

The node fusion function is usually used to fuse the nodes on a superposed face to achieve the continuity of the meshes in the process of the mesh level. If there is an overlapped mesh node on another element edge, or a node of small superposed face is made to move a minor distance in a plane and the two superposed faces are made to have a small separation, then some wires are added between the nodes of the two faces to maintain an electrical integrity.

Step S3.4: the Recombination of mesh element

An element recombination is performed after the extraction the surface nodes, as shown in FIG. 4. The numbers in FIG. 4 are only used as the node codes, wherein FIG. 4(a) is a hexahedral entity element of a finite element, the order of the nodes composed of this element is 1, 2, 3, 4, 5, 6, 7, 8, when the face of the most front hexahedral is the one as shown in FIG. 4(b), it needs to be divided into two triangles, as shown in FIG. 4(c). But the error as shown in FIG. 4(d) may also occur, FIG. 4(e) and FIG. 4(f) is the case of two elements after recombination according to the way shown in FIG. 4(d), the two elements are overlapped. For each 4-node element, the order is numbered in accordance with a node number, three points are respectively extracted in two directions to get two new mesh elements so as to avoid the error in FIG. 4(d). For each 3-node element, its original mesh element is retained directly.

Step S3.5: The process of middle nodes.

Sometimes, high-order element may occur in finite element analysis completed with a commercial mechanical analysis software such as ANSYS, and the node occurs not only on the vertex, but also at the midpoint of an element edge, as shown in FIG. 4. FIG. 4(g) is a 10-node tetrahedral element, with nodes 1,2,4 being assumed to be the surface triangles to be extracted, then four triangles are recombined with midpoints as shown in FIG. 4(h), if the mesh nodes are extracted only without using middle nodes, this will certainly lose deformation information, which can only reflect the displacements of nodes 1, 2 and 4, but not reflect the displacements of the nodes 5, 8 and 9, as shown in FIG. 4(i) below. So the middle nodes need to be transformed into mesh nodes.

Middle nodes are transformed into mesh nodes according to the following steps:

3.5.1 Finding Out the Number Rule of the Mesh Nodes of the Element Type for the Used Analysis Software.

For, finite element analysis software such as ANSYS, an element node number is arranged in clockwise or counterclockwise order, and its arrangement order is so as to, on the basis of clockwise or counterclockwise order, first ensure the shape of the element, and then determine the middle nodes, that is, for the element of which the number ranks first, its middle node number also ranks first.

3.5.2 Differentiating the Middle Node and the Mesh Node Based on the Node Number Rule and Extracting the Middle Node.

For the tetrahedron element in FIG. 4(g), the composition of the nodes is 1, 2, 3, 4, 5, 6, 7, 8, 9, 10, which is a clockwise arrangement of the node number. First, a bottom face is generated in a clockwise direction, then a vertex or face is generated with the same order and a corresponding start point, thereby the first four nodes is the key to determine the direction and maintain the shape, and last the middle node is determined according to the order of numbers of points and lines.

3.5.3 Connecting Adjacent Middle Nodes, Thus Forming a New Mesh with the Original Mesh Node.

As show in FIG. 4(g), the middle nodes 5, 6, 7, 8, 9, 10 connect the middle nodes with adjacent numbers, and thus forming a new mesh with its corresponding mesh nodes.

3.5.4 The Process is Performed Respectively Based on the Difference of Element Types, Thereby all of the Middle Nodes are Transformed into Mesh Nodes.

For different element types, the node number rules are different, so the above steps are repeated, according to difference of the types, to complete the transform of all middle nodes.

Figure 5:
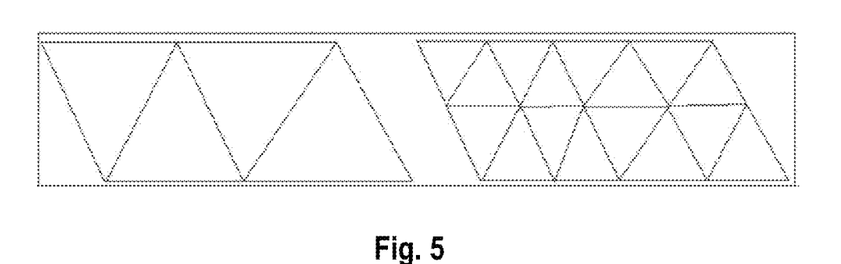
FIG. 5 is a diagram of subdividing a mesh.

Step S3.6: Subdividing the mesh according to the accuracy.

The mesh accuracies of the analysis softwares of different disciplines are different. Usually, the mesh density of structural analysis is higher than that of the thermal analysis, and less than that of the electromagnetic analysis. Therefore, the structural mesh extracted can be directly used for the thermal analysis but the electromagnetic analysis needs to subdivide the mesh according to the specific accuracy requirements. Mesh subdivision uses the common midpoint subdivision method, as shown in FIG. 5. Taking the midpoint of each side of an element, then the midpoints of the adjacent edges are connected to divide an element into four small similar elements, and so on, until the mesh size meets the accuracy requirement. In order to better match the precision, various analysis softwares should divide the mesh under the same rules. For example, the mesh is divided into equiangular triangles, equiangular quadrilateral, regular tetrahedron, regular hexahedron, and the like.

Step S4: Setting the parameters required for thermal analysis.

Based on the chassis CAD model established in Step 1, the specific heat and the thermal conductivity of a specific material of each part of the chassis is set during the temperature field thermal analysis, i.e. in thermal analysis software ICE-PAK, wherein the material includes the material of a main heat dissipation member; the power flow of each heat dissipation member, mainly of a fan, is selected; the heating power is set for the heat source inside the chassis; the ambient temperature during the analysis is selected last.

Step S5: the thermal analysis of the chassis.

The temperature field thermal analysis is performed on the transformed meshes, wherein the thermal analysis software, i.e. the commercial thermal analysis software ICEPAK, can be used to perform the thermal analysis of the chassis based on the relevant parameters determined according to Step 4 and required for the thermal analysis, thereby the temperature distribution within the chassis is achieved, and the analysis result is recorded in a data file.

Of course, the thermal analysis here can also be performed for the model by calculating with programs written by the designer or with other professional softwares having functions similar to those of a thermal analysis software such as ICEPAK.

Step S6: Setting the parameters required for the electromagnetic analysis.

6.1 Estimating the resonant frequency of the chassis. First, the theoretical resonant frequency is calculated based on the size of chassis structure, in terms of the $TE_{10P}$ microwave resonance model, where the subscript 10p is the mode of the microwave resonance, according to the formula:

$$f_{10p} = \frac{c}{2\pi\sqrt{\mu\varepsilon}}\sqrt{\left(\frac{\pi}{a}\right)^2 + \left(\frac{p\pi}{l}\right)^2}$$

Wherein a and l is the size of the chassis, $\in$ is the dielectric constant, $\mu$ is the magnetic permeability, c is the speed of light, P is the mode.

6.2 The extracted mesh model is imported into the electromagnetic analysis software, the strongest resonance frequency is found by sweeping near the theoretical resonant frequency, thereby the resonant frequency of the cavity to be analyzed is accurately determined.

6.3 The properties of absorbent materials are determined. The properties include an electrical conductivity, a magnetic permeability, an electric loss tangent and a magnetic loss tangent, normally the manufacturers of the absorbent materials will provide some property parameters, and those not provided can be referred to the value in the published literature, or can be given one.

The parameter values of the absorbent materials are determined according to the follow steps:

6.3.1 Referring to the literatures about absorbent materials, and preliminarily determining most of the parameter values;

A vendor of absorbent materials generally does not provide the micro-parameters of the absorbent materials but defines his products by giving test based macro-parameters. Based on this, the micro-parameters of a considerable portion of the absorbent materials are obtained by looking up the literatures, and due to the difference of the doped mass ratio of two substances, the measured micro-parameters are different, so the microscopic parameters are not necessarily suitable for direct application, but can be an important reference for parameters selection.

6.3.2 Assuming the range of the remaining parameters according to the analysis theory of an absorbent material.

Some of the parameters are assumed according to the analysis theory of an absorbent material. For a block of dielectric, when a relatively large electric loss tangent is given, it can be can be modeled as an electric loss absorbent material, and the same to a magnetic loss absorbent material, which is used in many literatures and engineering and is also a viable approach for simulating the absorbent material.

6.3.3 Based on the preliminarily determined value and scope, optimizing through a software simulation, and the specific value of a parameter is determined.

Based on the assumed range, a simulation is performed through a software to find a more appropriate set of parameters. The optimization is performed with the absorbent material being designed as a design variable, a reasonable range of microscopic parameters being designed as the upper and lower limits, the field strength leaked being designed as a target, and a set of optimal solution is obtained, the solution will be able to ensure that this set of micro-parameters can reflect the performance of the absorbent material.

Step S7: The electromagnetic analysis of the chassis.

The electromagnetic analysis is performed on the transformed meshes, wherein an electromagnetic analysis software, i.e. the commercial electromagnetic analysis software FEKO, can be used to perform the electromagnetic analysis of the chassis according to the relevant parameters determined according to Step 6, required for the electromagnetic analysis and selected in the software, thereby the electromagnetic field distribution inside and outside the chassis is obtained, and the analysis result is recorded in a data file.

Of course, the electromagnetic analysis performed on the transformed meshes here can also be performed for the model by calculating with programs written by the designer or with other professional softwares having functions similar to those of a commercial electromagnetic analysis software, such as FEKO.

Step S8: Designing a sample and correcting the result.

With respect to the result document of mechanic, electrical and thermal analysis, an experiment is designed to test the result of simulation analysis according to an actual work, and the result of analysis is corrected appropriately;

8.1 Sample manufacture. According to the preliminary CAD model, a practicality sample of the chassis is manufactured, including a ventilation hole, an aperture and a fan, an electromagnetic radiation element, and a support structure inside the chassis.

8.2 Electromagnetic measurement. Required related electromagnetic parameters of the chassis are measured for the sample, for example, the coupling degree inside the chassis and the leaked field strength one meter away. A microstrip antenna is used in the test of space field strength, which would interfere with an actual free-space field strength, and need to be corrected also.

8.3 Temperature measurement. A heat source simulating the heating of the component is enclosed in the chassis, and the temperature inside the chassis is measured.

8.4 The test result is compared with the simulation result, if the error meets the requirement of the analysis, the simulation model is considered in line with the actual sample, otherwise, the simulation model is modified until the requirement is met. Specifically, the result of the sample simulation is written as $C_{simulation}$, the result of the sample measurement is written as $C_{test}$, if the error $\alpha$ is within the specified value, for example, the specified value can be 15%, the simulation model is considered in line with the actual sample, otherwise, the simulation model is modified until the error $\alpha$ meets the requirement of being within the specified value, wherein $\alpha=[(C_{test}-C_{simulation})/C_{test}]\times 100\%$ 8.5 Correction of the simulation result. The actual chassis model is simulated in the optimization design and the simulation result is written as $E_{simulation}$, and then, using the above error α, the simulation result is corrected as $$E_{test} = \frac{E_{simulation}}{1-\alpha}.$$

Step S9: Designing a sample and correcting the result.

It is determined that whether the analysis result after the correction meets the design requirement or not, if yes, the optimization design is finished and the structure parameters of the chassis are output, if no, the preliminary CAD model, the electromagnetic analysis parameter and the thermal analysis parameter are modified and the steps (1) to (8) are repeated until the requirement is met.

Figure 6:
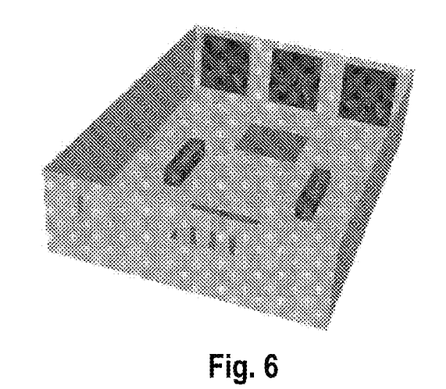
FIG. 6 is a diagram of a preliminary CAD model according to a simulation experiment of the present invention.

The advantage of the present invention can be further explained by the following experiment:

1. A Simulation Analysis:

A simple chassis is selected to perform the optimization simulation, the structure of which is as shown in FIG. 6. The chassis size is 500×375×125 mm, the wall thickness of the chassis is 2 mm, the material is aluminum, one end has three cooling fans, the other end has twelve ventilation slots, and the bottom face of the chassis has two heat sources of which the power are both 5 W. There exist an electromagnetic radiation module and an electromagnetic sensitive module, and the band considered is 0.5~1 GHz.

Electromagnetic Analysis Settings:

Absorbent material parameters: a dielectric constant of 2.7, an electric loss tangent of 0.01, a magnetic permeability of 1, and a magnetic loss tangent of 0

Electromagnetic radiation: 5 w

Antenna type: a dipole antenna

Analysis frequency: 730 MHz, the resonant frequency of the instance chassis is 730 MHz through a theoretical calculation and a simulation test.

Thermal Analysis Settings:

Thermal conductivity of the heat source: 0.2 W/m·K

Fixed flow of the fans: 0.001 m³/s

Ambient temperature: 35° C.

The optimization model of the instance is:

Design Variables $X=(x_1^1, x_2^1, x_3^1, x_4^1, x_1^2, x_2^2, x_3^2, x_4^2)^T$

The objective function $f(X) = 0.5 C_{max}(X) + 0.5 E_{max}(X)$

Constraints $360 \geq x_1^1 \geq 7.5 \quad 242.5 \geq x_3^1 \geq 7.5 \quad 360 \geq x_1^2 \geq 7.5$
$492.5 \geq x_3^2 \geq 257.5$ $375 \geq x_2^1 \geq 15 \quad 250 \geq x_4^1 \geq 15 \quad 375 \geq x_2^2 \geq 15 \quad 250 \geq x_4^2 \geq 15$ $x_1^1 + x_2^1 \leq 375 \quad x_3^1 + x_4^1 \leq 500 \quad x_1^2 + x_2^2 \leq 375 \quad x_3^2 + x_4^2 \leq 500$ $0 \leq x_3^2 - (x_3^1 + x_4^1) \leq 470$ $V(X) \leq 46000$ $T_{max} < 95$ Wherein, $x_1^1$, $x_2^1$ are respectively the position and the size of a first absorbent material along the x direction, $x_3^1$, $x_4^1$ the position and the size of the first absorbent material along the y direction, $x_1^2$, $x_2^2$ are respectively the position and the size of the second absorbent material along the x direction, $x_3^2$, $x_4^2$ are respectively the position and the size of the second absorbent material along the y direction. C(x) and E(x) of the optimization targets are respectively the coupling degree inside the chassis and the leaked field strength at a position facing an open and one meter away from the chassis. All the absorbent materials are mounted inside the chassis. Only the position and the size of the plane of the absorbent material are considered during the optimization, with a fixed thickness of 50 mm. The maximum allowable area of the absorbent material V(x) is set to 46000 mm². With reference to an allowed temperature value of a general electronic device, the constrained temperature $T_{max}$ is set as 95.

2. Sample Test

Figure 10:
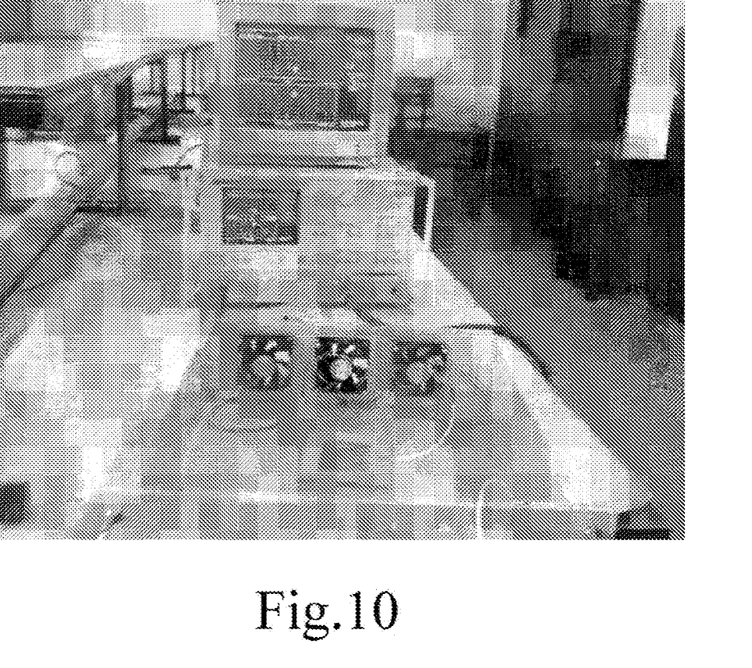
FIG. 10 is a picture of practicality of an electromagnetic test according to a simulation experiment of the present invention.

Internal Coupling Degree Measurements:

The measuring instrument uses a vector network analyzer, instrument model of wilton37269A, and the measurement site is selected to be in the room. The selected antenna for the measurement is a microstrip antenna having a center frequency of 730 MHz, a bandwidth of 10%, and being placed inside the chassis. The microstrip antenna uses a coaxial cable of 50 ohm for feeding. The measure practicality is as shown in FIG. 10.

The measurement of the leaked field strength one meter away:

The instrument and the site for the experiment of measuring the leaked field strength is the same as that of the measurement of coupling degree. And other test conditions are substantially the same also, and the receive antenna is placed at a position facing the open of the chassis and one meter away.

Figure 11:
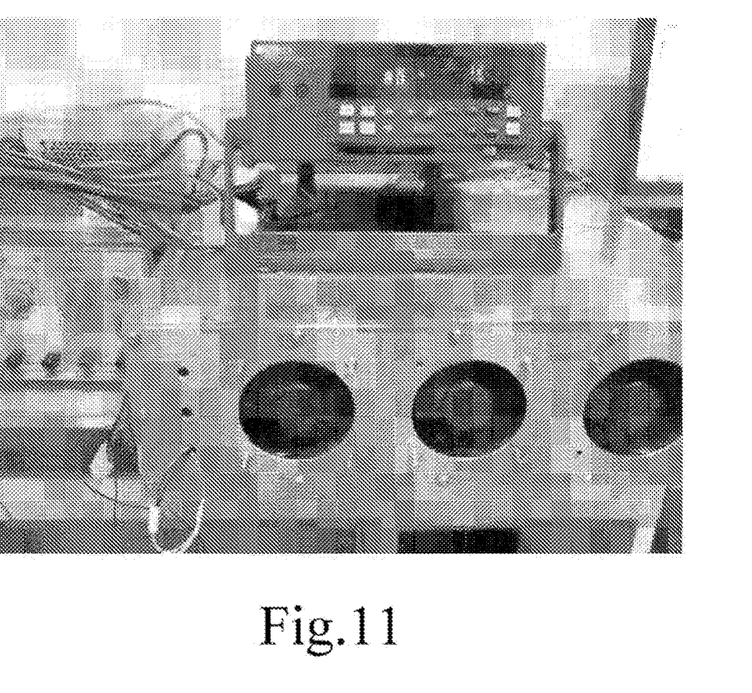
FIG. 11 is a picture of practicality of a temperature test according to a simulation experiment of the present invention.

Temperature Measurement:

The temperature testing instrument uses FLUKE HYDRA SERIESS 2. The model of the DC stabilized voltage supply is HT-1722F. The temperature test site is selected in the indoor environment, and the ambient temperature is a room temperature. The specific practicality for temperature testing is as shown in FIG. 11, it is the DC power supply at the left-down of the chassis, and three switching power supplies for powering the three fans are placed on the DC power supply. It is a temperature measure instrument that is placed on the chassis. Two 5 w heat sources are installed at two specified points within the chassis and are connected in series to the DC power supply. The output of the power supply is constantly set to 1 A to ensure that the power of the heat source is fixed to 5 w. Then a thermocouple used to measure the temperature is mounted on the heat sources and the leads of the thermocouple are connected to thermometer to read a temperature value.

The test data resultant from the temperature test is as shown in Table 2:

TABLE 1

| Measurement results | | | | |
| --- | --- | --- | --- | --- |
| | Left heat source | Right heat source | Ambient temperature | Instrument error |
| With absorbent material mounted | 80° C. | 71° C. | 23° C. | 1.5° C. |
| Without absorbent material mounted | 82° C. | 62° C. | 23° C. | 1.5° C. |

It can be seen from table 1 that, after mounting an absorbent material, the temperature at one heat source does not change much, from 82° C. to 80° C., but that of the other heat source increases greatly, from 62° C. to 71° C. That the absorbent material blocks the wind channel has a certain effect on the heat dissipation. However, since the highest temperature is not more than 82° C., and such a temperature does not have much effect on an electronic component, the temperature inside the chassis is within the limit of safe work of the electronic device.

Figure 7:
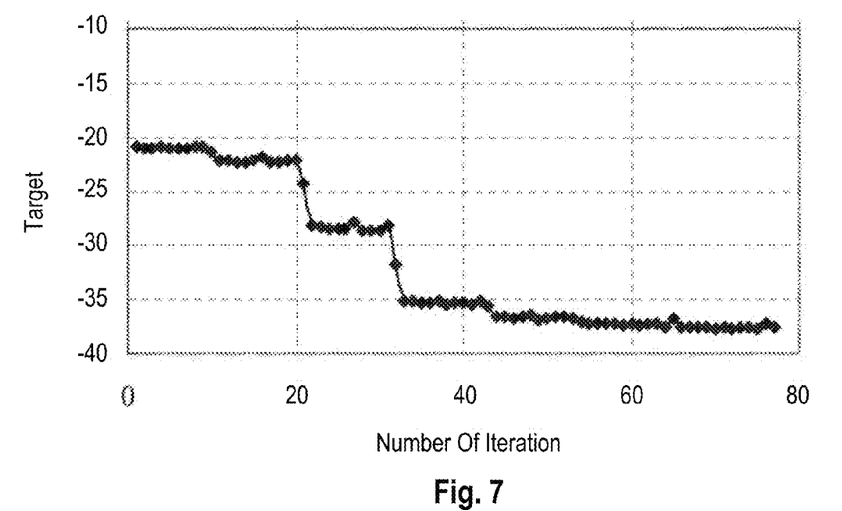
FIG. 7 is a graph of an iterative curve for optimizing a target according to a simulation experiment of the present invention.
Figure 8:
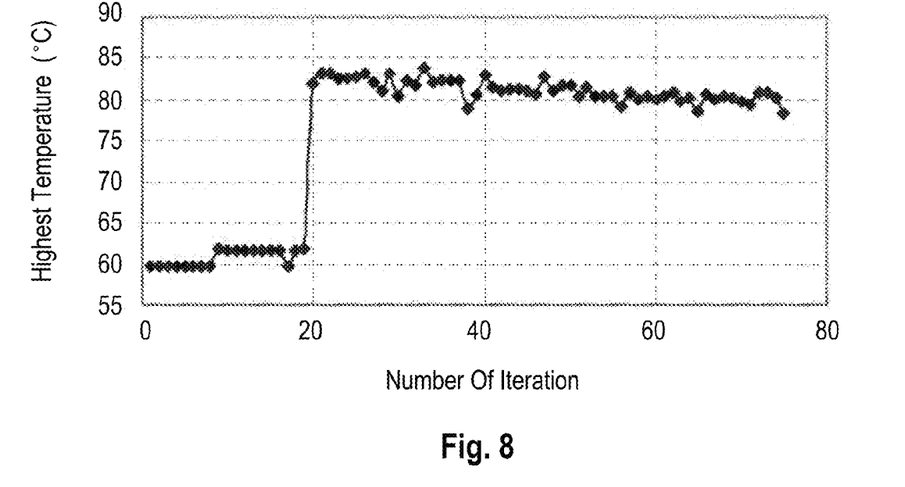
FIG. 8 is a graph of the temperature constraint iterative curve according to a simulation experiment of the present invention.
Figure 9:
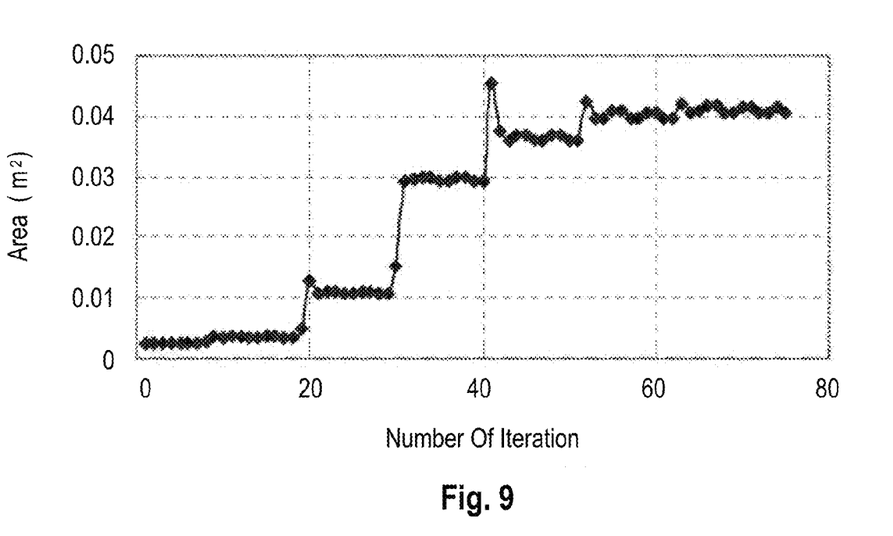
FIG. 9 is a graph of the area constraint iterative curve according to a simulation experiment of the present invention.

3. Optimization Results:

The iterative curve of the optimized target function is as shown in FIG. 7, the temperature constraint iterative curve is as shown in FIG. 8, and the area constraint iterative curve is as shown in FIG. 9. The optimization results are as shown in Table 2.

TABLE 2

Optimization results

|  |  | Meaning | Initial Value | Optimum Value | Up Limit | Down Limit |
|---|---|---|---|---|---|---|
| Optimization variables | $x_1^1$ | The center point of the first absorbent material along X direction | 180 | 255.0 | 352.5 | 7.5 |
|  | $x_2^1$ | The size of the first absorbent material along X direction | 35 | 151.3 | 375 | 15 |
|  | $x_3^1$ | The center point of the first absorbent material along Y direction | 117.5 | 138.5 | 242.5 | 7.5 |
|  | $x_4^1$ | The size of the first absorbent material along Y direction | 35 | 149.6 | 250 | 15 |
|  | $x_1^2$ | The center point of the second absorbent material along X direction | 180 | 107.5 | 352.5 | 7.5 |
|  | $x_2^2$ | The size of the second absorbent material along X direction | 35 | 140 | 375 | 15 |
|  | $x_3^2$ | The center point of the second absorbent material along Y direction | 367.5 | 360.8 | 492.5 | 257.5 |
|  | $x_4^2$ | The size of the second absorbent material along Y direction | 35 | 140.4 | 250 | 15 |
| Constraint | T | The highest temperature inside the chassis | 60 | 78 | 95 | none |
|  | A | The area of the absorbent material | 0.0025 | 0.0406 | 0.046 | 0 |
| Target | $C_{max}$ | The corrected coupling degree | −29.7 | −42.5 | none | none |
|  | $E_{max}$ | The leaked field strength one meter away | −13.3 | −30.7 | none | none |

During the optimization iteration process, the changes of the length and the width of absorbent materials closely relate to the target, and the coupling degree and the leaked field strength are both improved significantly with the area of the absorbent material increases. It can be seen from FIG. 7 that: when the area of the absorbent material increases to a certain extent, the electromagnetic shielding effectiveness will not be significantly improved further when the area of the absorbent material is further increased.

From the optimization results in table 2, it can be seen that, by optimization, the internal coupling degree of the chassis and the leaked field strength one meter away significantly decreased, the internal coupling degree decreases from −29.7 dB to −42.5 dB, the leakage field strength one meter away decreases from −13.3 dB to −30.7 dB, which indicates that the method of the present invention is effective.

We claim:

1. An optimization design method for a chassis structure of an electronic device based on mechanical, electrical and thermal three-field coupling, comprising the following steps:
   (1) determining a preliminary design size of the chassis structure according to a work environment of the electronic device and a specific need and, based on the preliminary design size, establishing a preliminary CAD model of the chassis structure for a mechanical finite element analysis;
   (2) establishing a finite element model with respect to the preliminary CAD model first, and obtaining various structural mechanics parameters and a chassis body deformation which are compiled into a mechanical analysis data file, by setting a constraint and a load, and performing a related mechanical finite element analysis based on a requirement using a related mechanical analysis software;
   (3) extracting a deformed chassis mesh model from the mechanical analysis data file, and performing a transform of the deformed chassis mesh model among said three fields of mechanical, electrical, and thermal, and obtaining an extracted electromagnetic analysis mesh model and an extracted thermal analysis mesh model, wherein the extracting the deformed chassis mesh model and the performing the transform of the mesh model among said three fields includes the following steps:
      (3a) combining a chassis mesh and one or more entity meshes having an overlap with the chassis mesh to produce the deformed chassis mesh model;
      (3b) transforming a middle node in the deformed chassis mesh model into a mesh node;
      (3c) extracting a node of a board shell element mesh from the deformed chassis mesh model;
      (3d) extracting a node of an entity element surface mesh from the deformed chassis mesh model;
      (3e) recombining the extracted mesh nodes into a new mesh element; and
      (3f) subdividing said new mesh element based on an electromagnetic analysis accuracy requirement and a thermal analysis accuracy requirement;
   (4) setting a specific heat and a thermal conductivity of a material of a heat dissipation component, and preliminary thermal analysis parameters including a power flow of a fan and an ambient temperature, based on the preliminary CAD model in step (1);
   (5) importing the extracted thermal analysis mesh model in step (3) and the set thermal analysis parameters in step (4) into a related thermal analysis software to perform temperature field thermal analysis, so as to obtain a temperature field distribution of the chassis and compile it into a heat analysis data file;
   (6) determining preliminary electromagnetic analysis parameters including at least a resonant frequency of the chassis and an electrical parameter of an absorbent material, based on the preliminary CAD model in step (1);

(7) performing an electromagnetic analysis on the extracted electromagnetic analysis mesh model in step (3) with a related electromagnetic analysis software, so as to obtain an electromagnetic field distribution inside and outside the chassis and compile it into an electromagnetic analysis data file;

(8) designing a simulation sample using the mechanical analysis data file, the electromagnetic analysis data file and the thermal analysis data file, and performing a simulation analysis on said simulation sample based on an actual engineering condition, then obtaining a simulation error by testing a result of the simulation analysis with an experiment, and correcting the simulation analysis result of the preliminary CAD model based on the simulation error; and (9) determining whether or not the design of the chassis meets the specific need of step (1) based on the corrected simulation analysis result, wherein:

(9a) if the design of the chassis meets the specific need of step (1), then the optimization design is finished and the parameters of the chassis are output; or (9b) if the design of the chassis does not meet the specific need of step (1), then the preliminary CAD model, the electromagnetic analysis parameters and the thermal analysis parameters are modified and steps (1) to (9) are repeated until the specific need of step (1) is met.

2. The optimization design method for the chassis structure of the electronic device according to claim 1, wherein combining overlapped meshes according to step (3a) is performed according to the following steps:

(3a-1) determining an overlapped mesh portion of the chassis mesh and the one or more entity meshes and combining or deleting the overlapped mesh portion by geometric Boolean operation in a model level; and (3a-2) combining any superposed nodes of the overlapped mesh portion through a node fusion function in a mesh level.

3. The optimization design method for the chassis structure of the electronic device according to claim 1, wherein transforming the middle node into the mesh node according to step (3b) is performed according to the following steps:

(3b-1) based on a mesh element type, finding out a mesh node number rule for the related thermal analysis software, the related mechanical analysis software, and the related electromagnetic analysis software;

(3b-2) based on the node number rule, differentiating the middle node and the mesh node and extracting the middle node;

(3b-3) connecting adjacent middle nodes, forming a new mesh with the original mesh node; and (3b-4) performing steps (3b-1) to (3b-3) for all mesh element types, thereby all middle nodes are transformed into mesh nodes.

4. The optimization design method for the chassis structure of the electronic device according to claim 1, wherein determining preliminary electromagnetic analysis parameters including at least a resonant frequency of the chassis and an electrical parameter of an absorbent material according to step (6) includes the following steps:

(6a) calculating a theoretical resonant frequency with a theoretical resonant frequency calculation formula based on the size of the chassis structure, the theoretical resonant frequency calculation formula is as follows:

$$f_{10p} = \frac{c}{2\pi\sqrt{\mu_r \varepsilon_r}} \sqrt{\left(\frac{\pi}{a}\right)^2 + \left(\frac{p\pi}{l}\right)^2}$$

where $f_{10p}$ is the theoretical resonant frequency of a $p^{th}$ mode according to a 10p resonance model,
$a$ is a width of the chassis,
$l$ is a length of the chassis,
$\varepsilon_r$ is a dielectric constant,
$\mu_r$ is a magnetic permeability,
$c$ is the speed of light, and
$p$ is a mode;

(6b) using the electromagnetic analysis software of step (7) to find an actual resonant frequency of the chassis by sweeping near the theoretical resonant frequency as defined by the theoretical resonant frequency calculation formula of step (6a) to find a resonance frequency with a strongest electromagnetic field strength; and (6c) determining parameter values including an electric conductivity, the magnetic permeability, an electric loss tangent and a magnetic loss tangent of the absorbent material of step (6) based on one of related property parameters provided by a manufacturer of the absorbent material, set values in published documents, or assuming values in advance.

5. The optimization design method for the chassis structure of the electronic device according to claim 4, wherein determining parameter values of the absorbent material according to step (6c) is performed through the following steps:

(6c-1) determining preliminarily values of known parameters of the absorbent material available from said one of the parameters provided by the manufacturer of the absorbent material or said set values in said published documents of step (6c);

(6c-2) assuming ranges of remaining parameters of the absorbent material unavailable from said one of the parameters provided by the manufacturer of the absorbent material or said set values in said published documents of step (6c) based on an analysis theory of the absorbent material; and (6c-3) obtaining a set of optimal solutions of the known parameters and the remaining parameters through a software simulation based on the preliminary values of the known parameters and the ranges of the remaining parameters.

6. The optimization design method for the chassis structure of the electronic device according to claim 1, wherein correcting the simulation analysis result according to step (8) includes the following steps:

(8a) manufacturing an actual sample of the chassis according to the preliminary CAD model to provide a standard for sample experiment;

(8b) measuring an electric field distribution value inside and outside the actual sample of the chassis;

(8c) measuring an actual sample temperature field distribution value inside the actual sample of the chassis;

(8d) comparing, for each value measured from the actual sample of the chassis, an experimental result with a corresponding simulation result simulated from the preliminary CAD model to determine the simulation error, wherein (8d-1) if the simulation error meets a tolerance requirement of being within a specified value, then the simulation sample is considered in line with the actual sample; or (8d-2) if the simulation error does not meet the tolerance requirement of being within a specified value, then the simulation sample is modified until the tolerance requirement is met;
wherein the simulation error is determined as:

$$\alpha=[(C_{test}-C_{simulation})/C_{test}]\times 100\%$$

where $\alpha$ is the simulation error,
$C_{test}$ is the experimental result, and
$C_{simulation}$ is the simulation result; and (8e) simulating the actual sample of the chassis to determine a simulated standard result of each value, and then correcting the simulation result of each value as:

$$E_{test} = \frac{E_{simulation}}{1-\alpha}$$

where $E_{test}$ is a corrected simulation result, and $E_{simulation}$ is the simulated standard result.

* * * * *